Patented Dec. 19, 1922.

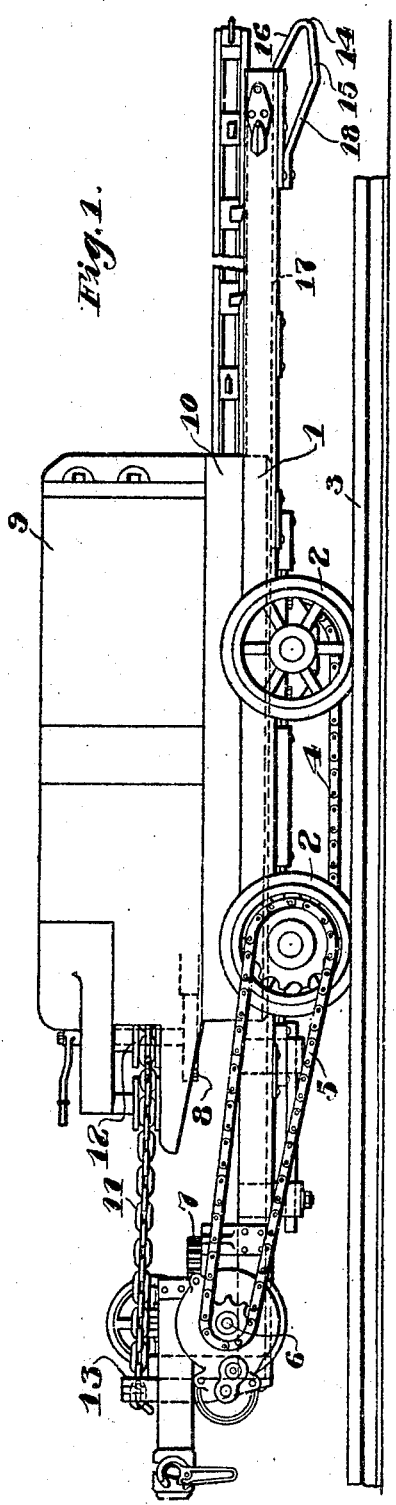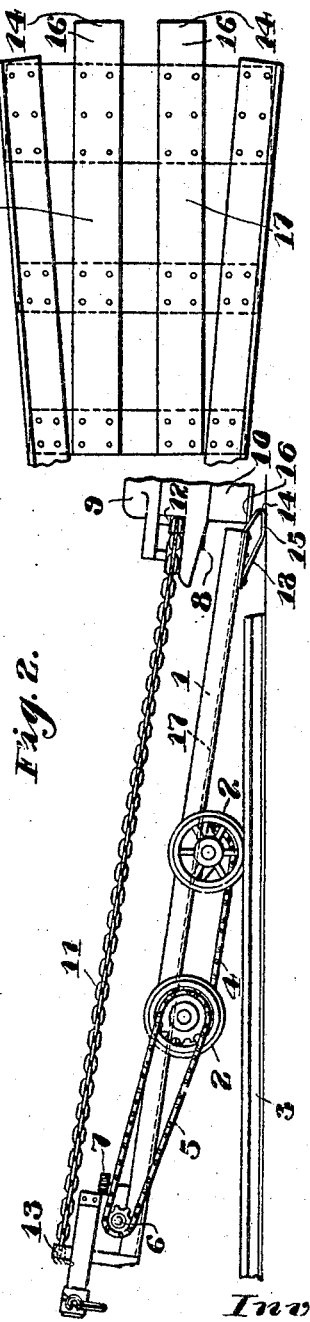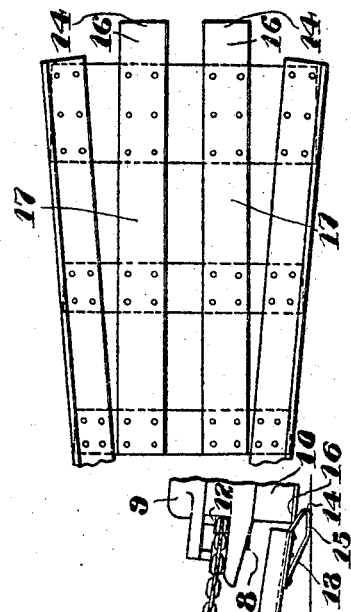

1,439,020

UNITED STATES PATENT OFFICE.

EDMUND C. TREESE, OF HUNTINGTON, WEST VIRGINIA, ASSIGNOR TO SULLIVAN MACHINERY COMPANY, A CORPORATION OF MASSACHUSETTS.

TRUCK.

Application filed December 5, 1917, Serial No. 205,647. Renewed June 15, 1920. Serial No. 389,233.

*To all whom it may concern:*

Be it known that I, EDMUND C. TREESE, a citizen of the United States, residing at Huntington, in the county of Cabell and State of West Virginia, have invented certain new and useful Improvements in Trucks, of which the following is a full, clear, and exact specification.

My invention relates to trucks.

It has for its object to provide an improved truck especially adapted to use in connection with a mining machine whereby the latter may be loaded or unloaded from the truck in an improved manner. A more specific object of my invention is to provide an improved truck having improved and simplified means thereon adapted to prevent derailing or breakage of the truck and to facilitate the loading or unloading of a mining machine onto or from the truck, which means are of a rugged form and may be readily applied to or incorporated in a truck at small expense, and which are well adapted to perform their function in the field. These and other objects and advantages of my improvement will hereinafter more fully appear.

In the accompanying drawings, I have shown for purposes of illustration one embodiment which my invention may assume in practice, illustrating the same as applied to a mining machine truck of standard form.

In these drawings,—

Fig. 1 is a side elevation of a truck equipped with my improvement, a mining machine being shown in partially loaded position thereon.

Fig. 2 is a simplified somewhat diagrammatic side elevation of the construction shown in Fig. 1, the truck being shown in its tilted loading position and the mining machine being illustrated as partially loaded thereon.

Fig. 3 is a detail plan view of a portion of the truck showing my improvement applied thereto.

In this illustrative construction, I have shown a well known construction of rigid truck 1 having horizontally disposed upper guiding surfaces and an elongated front end, carried on front and rear truck wheels 2 which are in turn adapted to move along the track 3. As shown, these wheels 2 are spaced apart and are driven through suitable driving connections 4 and 5 from a power shaft 6 located at the rear of the truck and adapted to be connected in a well known manner through a driving gear 7 with a suitable cooperating gear 8 on a mining machine 9, which is in turn carried on a pan 10 and adapted to be slid therewith longitudinally of the truck during the loading or unloading operation. As in a usual construction, this machine 9 is provided with a suitable flexible feeding element 11, herein shown in the form of a chain, driven by a suitable driving member or sprocket 12, and adapted to have its free end connected either at a point adjacent the face or to a chain fork 13 at the rear end of the truck, so that the machine may be fed off or on the truck under its own power, the truck tilting about its front wheels during the unloading operation and assuming its tilted position during the loading operation, all in a well known manner.

In my improvement, it will be noted that the truck 1 is provided at its front extremity with one or more depending members 14 extending downward a substantial distance beneath the front end of the truck frame and having under surfaces 15 adapted, when the truck is tilted, to engage the bottom in such a manner as to prevent the rear end of the truck from being elevated beyond a certain amount. As shown, two of these members 14 are provided, and the same are provided with enlarged flat surfaces 15 and are laterally spaced, as indicated, in order that a stable support may be provided. As illustrated, the same are also preferably provided with downwardly inclined upper surfaces 16 adapted to cooperate in the loading and unloading of the mining machine. In a preferred form, these members 14 are each formed from a single flat strip of steel the rear end 17 of which is extended to form a part of the front end of the truck and a supporting surface for the mining machine as it passes off of the latter, while the front end of the same after being bent into such form as to produce the surfaces 15 and 16, is then bent back as shown at 18 in order to enable it to be attached to the under side of the truck and thus increase the rigidity of the construction.

In the use of mining machine trucks, which are made very strong and substantial and are usually devoid of any shock absorbing means, as the mining machine is pulled off the truck, the latter is tilted on the front wheels until the front end rests on the mine floor. When the mining machine is unloaded the front end of the truck is released and the heavy rear end returns the rear wheels to the track with a force that tends to rack the whole frame and to wear the bushings in which the axles, especially the rear one, turn. By the use of my improvement, it will be observed that an exceedingly simple and rigid construction is produced which is adapted not only to support the front end of the truck 1 in such a manner that the rear end is prevented from being elevated to too great a degree, but a construction is also produced in which means are provided whereby the mining machine and pan may pass readily off of the truck 1 and onto the bottom without a severe drop. More specifically, it will be observed that during the operation of unloading the machine the movement of the rear end of the truck is limited by the engagement of the members 14 with the bottom so that when the machine has passed off of the then tilted truck, the rear end of the latter may not strike the rails more than a relatively light blow, all difficulty with derailing and breakage thus being eliminated. It will also be observed that during unloading, i. e. as the machine 9 and its supporting pan 10 move off of the truck under the action of the sprocket 12 upon the chain 11, the rear end of the pan 10 is supported on the sloping surfaces 16 and thus brought gradually into engagement with the bottom at the same time that all danger of possible breakage through contact of the gear 8 with the end of the truck, is prevented. As the machine is loaded, it will be obvious that the pan 10 may be supported as usual upon the front end of the truck and the machine then fed rearwardly into and thereafter with the pan during the loading operation, the members 14 acting at this time as supports tending to reduce the grade up which the parts must be propelled, and thus facilitating the loading operation and reducing the power required.

As a result of my improvement, it will be noted that the machine guiding and truck supporting means thus provided are of an exceedingly simple form well adapted to be formed with the truck at small expense and to be of a rugged character calculated to withstand the rough usage to which such devices are subjected in service. It will also be observed that these means provide a supporting and guiding surface disposed substantially beneath the entire width of the mining machine both during its movement toward or from the truck, and that at the same time an exceedingly substantial support is provided well adapted not only to carry the weight of the machine during the loading and unloading operations, but also to permit the truck to be thereafter readily moved about the mine without the necessity for any separate manipulation or adjustment on the part of the operator. These and other advantages of my improved construction will, however, be clearly apparent to those skilled in the art.

While I have in this application specifically described one embodiment which my invention may assume in practice, it will be understood that this form of the same is shown for purposes of illustration and that the invention itself may be modified and embodied in various other forms without departing from its spirit or the scope of the appended claims.

What I claim as new and desire to secure by Letters Patent is:

1. In a truck, a wheeled truck frame, and depending means beneath the front end thereof for limiting the tilting movement of the truck.

2. In a truck, a wheeled truck frame having an elongated front end, and means disposed beneath the front end of said frame for limiting the tilting movement of the same.

3. In a truck, a wheeled truck frame, and machine supporting and guiding means disposed beneath the front end thereof for limiting the tilting movement thereof and guiding a machine unloaded therefrom.

4. In a truck, a wheeled truck frame, and depending means disposed beneath the front end of said frame and carried thereby having downwardly inclined machine guiding portions at its front end.

5. In a truck, a wheeled truck frame, and a plurality of depending spaced machine guiding and supporting elements disposed beneath the front end of said frame and having inclined forwardly extending surfaces.

6. In a truck, a wheeled truck frame, and a depending machine guiding and supporting element disposed beneath the same at its front end and having a ground engaging surface and an inclined surface leading to the surface of said frame.

7. In a truck, a wheeled truck frame, and means disposed beneath the front end of said truck and carried thereby for limiting the tilting movement of said truck, said means having a plurality of laterally spaced inclined machine supporting and guiding surfaces.

8. In a truck, a wheeled truck frame, and means disposed beneath the front end of said truck and carried thereby for limiting the tilting movement of said truck, said means having a substantially flat inclined machine supporting and guiding surface and a lower ground engaging surface disposed at an angle thereto.

9. In a truck, a wheeled truck frame, and means disposed beneath the front end of said truck and carried thereby for limiting the tilting movement of said truck, said means having a plurality of laterally spaced substantially flat inclined machine supporting and guiding surfaces and a plurality of lower ground engaging surfaces disposed at an angle thereto.

10. In a truck, a wheeled machine guiding truck frame having at its front end a plurality of laterally spaced inclined and rearwardly disposed portions, the said inclined portions being disposed at the front end and at an angle relative to the machine guiding portion of said frame, and the rearwardly disposed portions being disposed beneath said inclined portions and the front end of said frame.

11. In a truck, a wheeled truck frame, and forwardly extending, depending elements thereof for limiting the tilting movement of the truck.

12. In a truck, a wheeled truck frame, and forwardly extending elements thereof disposed beneath the front end of the truck for limiting the tilting movement of the truck.

13. In a truck, a plurality of wheeled members, a truck frame carried thereby and adapted to swing about the forward wheeled member, and depending means on the front end of said frame for limiting the tilting movement of the truck.

14. In a truck, front and rear truck wheels, a machine guiding frame supported thereon and tiltable about a horizontal pivot forward of the rear wheels, and means disposed beneath the front end of said frame for limiting the tilting movement of the same.

15. In a truck, front and rear truck wheels, axles therefor, a machine guiding frame supported thereon and tiltable about a horizontal pivot and bearing a fixed relation to the axle of said front wheels, and means disposed beneath the front end of said frame for limiting the tilting movement of the same.

16. In a truck, front and rear truck wheels, axles therefor, a machine guiding frame supported thereon and tiltable about a horizontal pivot bearing a fixed relation to the axle of said front wheels, and means disposed beneath the front end of said frame for limiting the tilting movement of the same.

17. In a truck, front and rear truck wheels, a machine guiding frame tiltable about a horizontal pivot in front of said rear wheels and supported on said front and rear wheels, and a plurality of downwardly and rearwardly bent members rigidly carried by said frame and limiting the tilting movement thereof.

18. In a truck, front and rear truck wheels, a machine guiding frame supported by said wheels and tiltable about a pivot in front of said rear wheels, said pivot lying in a horizontal plane at a fixed distance above the surface over which said truck is adapted to move, and means disposed beneath the front end of said frame for limiting the tilting movement of the same.

In testimony whereof I affix my signature.

EDMUND C. TREESE.